United States Patent [19]

Hiibel

[11] Patent Number: 4,948,942
[45] Date of Patent: Aug. 14, 1990

[54] TUNGSTEN INERT GAS WELDING TORCH
[75] Inventor: Paul J. Hiibel, Auburn, Wash.
[73] Assignee: C-K Systematics, Inc., Auburn, Wash.
[21] Appl. No.: 471,645
[22] Filed: Jan. 29, 1990
[51] Int. Cl.5 .............................................. B23K 9/10
[52] U.S. Cl. ................................. 219/132; 219/130.1
[58] Field of Search ...................... 219/132, 130.1, 136
[56] References Cited
U.S. PATENT DOCUMENTS 3,968,341 7/1976 Manning ............................. 219/132
4,051,344 9/1977 Robbins .............................. 219/132
4,227,066 10/1980 Bulwidas, Jr. ..................... 219/132

Primary Examiner—Clifford C. Shaw
Attorney, Agent, or Firm—Keith D. Gehr

[57] ABSTRACT

The invention is a welding torch with a control means on the torch itself for adjusting welding current. This control means has a thumb button which can be actuated by the welder to turn the torch on or off and to adjust the current to an appropriate value for the weld being made. A latch means at one extreme of its travel is provided to hold the thumb button in the off position. This prevents the torch from being accidentally actuated by inadvertently moving the button.

4 Claims, 2 Drawing Sheets

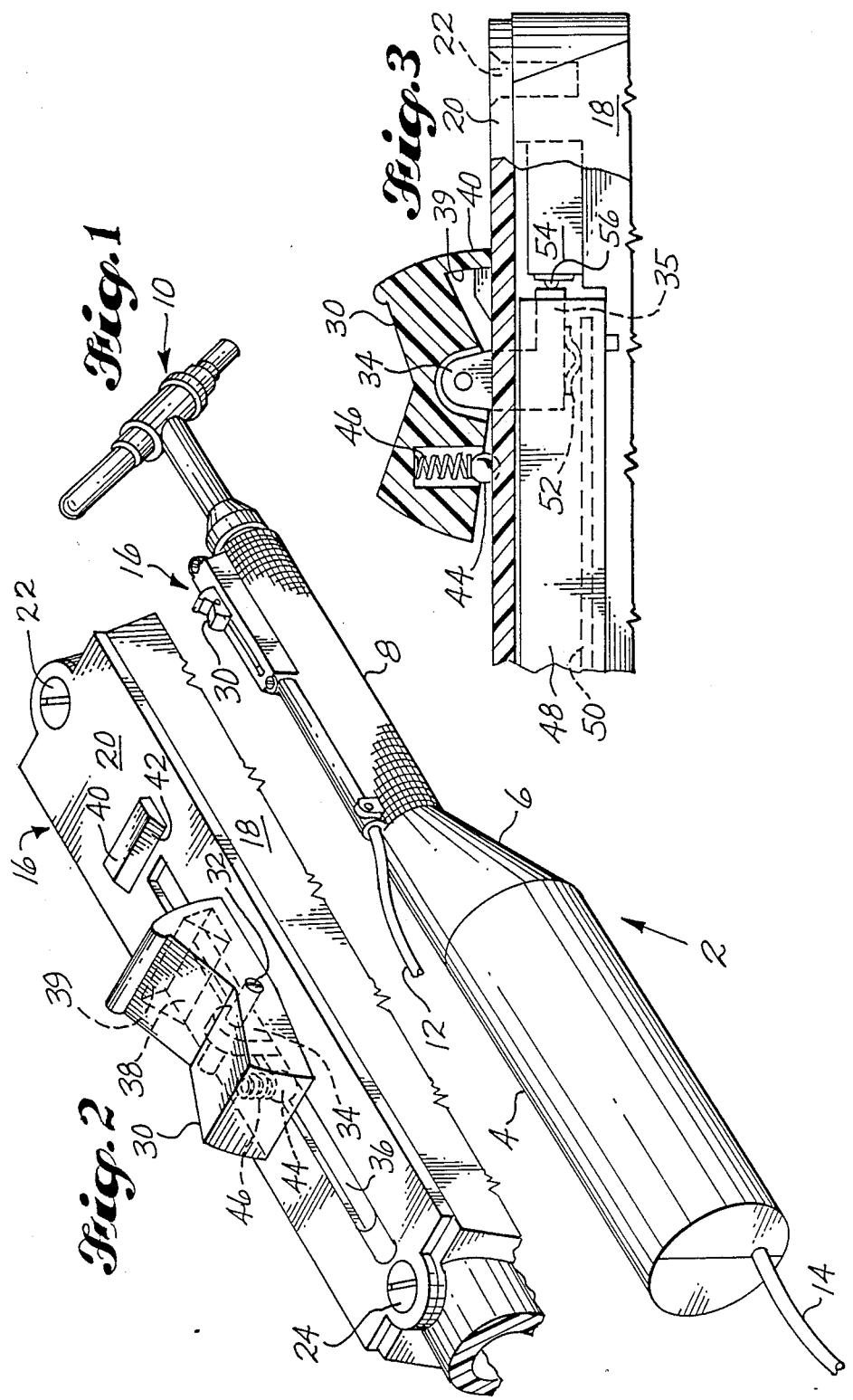

TUNGSTEN INERT GAS WELDING TORCH

BACKGROUND OF THE INVENTION

The present invention is an improved tungsten inert gas welding torch for shielded arc welding. The torch is particularly convenient since it gives the welder immediate fingertip control of electric current.

Torches which give a welder control of electric current by some mechanism located on the torch itself are fairly well known. As one example, reference might be made to U.S. Pat. No. 4,051,344 to Robbins. This patent is herein included by reference.

The present welding torch is one having significantly improved safety and convenience features as compared with the Robbins device.

SUMMARY OF THE INVENTION

The present invention is a welding torch giving the welder immediate fingertip control of welding current. The torch comprises a relatively conventional axially elongated body of a convenient size to be held in a welders hand. The body has an attached head portion containing a welding electrode and a gas cup or other means to shield the electrode and weld area with an inert gas. A linear potentiometer is contained within the torch body. This potentiometer serves, along with appropriate associated circuitry, to adjust welding current. The body also contains an on/off switch which actuates the main contactor at the welding console. The potentiometer has an upstanding control arm which also has an extension that serves to actuate the on/off switch.

A slidable thumb button is located adjacent to the body of the torch and pivotally attached to the control arm. The thumb button serves to move the control arm parallel to the axis of the body so that the switch and linear potentiometer are appropriately operated. The switch is located so that it will be actuated into the off position at one of the extreme positions of travel of the thumb button.

The torch body has an upstanding lug which is sized to engage a latch associated with the thumb button. This lug is positioned at the extreme location of thumb button travel where the on/off switch is actuated. The lug and latch work to retain the button against accidental movement and maintain the switch in the off position. To operate the torch the button is simply rocked on its pivotal mounting to raise and disengage the latch from the upstanding lug. This then enables linear movement of the thumb button. The lug may have a leading edge formed at an acute angle with the body to form a ramp so that the latch portion of the thumb button readily slides over the lug to actuate the switch into the off position without the latch being consciously raised by the welder. Most preferably the latch is formed by a shoulder on a cavity formed within the thumb button.

It is an object of the present invention to provide a welding torch having convenient thumb control of welding current.

It is another object to provide a welding torch having a mechanism to prevent accidentally turning on the welding current.

These and many other objects will become readily apparent to those skilled in the art upon reading the attached detailed description taken in conjunction with the drawings.

BRIEF DESCRIPTION OF THE DRAWINGS

FIG. 1 is an overall perspective view of a welding torch.

FIG. 2 is a perspective view of the thumb button mechanism which controls welding current.

FIG. 3 is a side elevation, partially cut away, of the thumb button current control mechanism shown in the latched position.

DETAILED DESCRIPTION OF THE PREFERRED EMBODIMENTS

Figure 4:
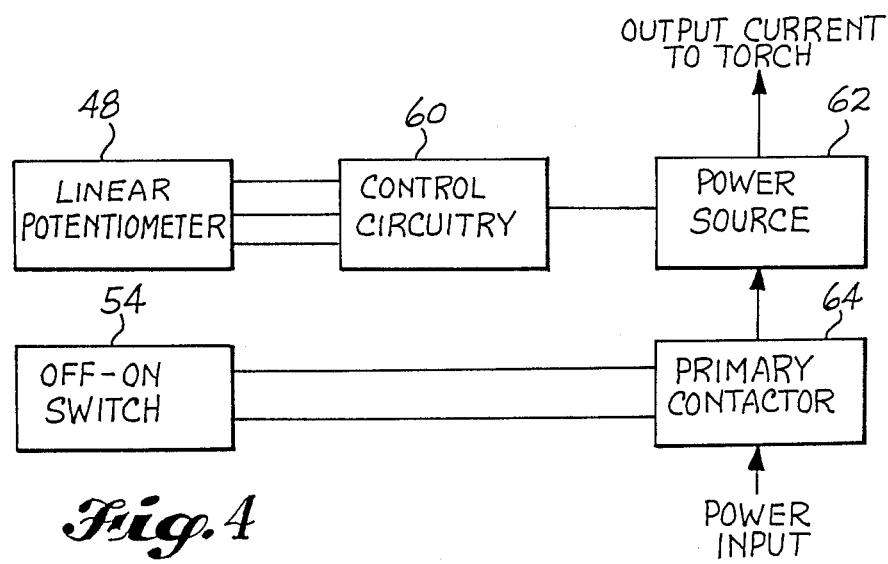
FIG. 4 is a block diagram of the welder electrical control circuits.

The construction and operation of the present welding torch can be readily understood by referring now to the drawings. In FIG. 1 the torch, generally shown at 2, comprises an axially elongated body 4 having a transition portion 6 and a forward portion 8. A head 10 is attached to the forward portion. This head holds the welding electrode and has a gas cup or similar shield means to direct inert gas around the electrode and the weld zone. The head may also be constructed to carry an internal fluid coolant. Supply lines 12, 14 bring power, inert gas, and coolant to the torch.

The present invention is particularly concerned with the current control mechanism generally shown at 16 on FIG. 1. This is contained within a small housing 18 which should be regarded as an extension of the body and may be made integral with the forward portion 8 of body 4. As seen in FIGS. 2 and 3, the housing 18 has a cover 20 held by machine screw fasteners 22, 24. Most typically the body 4, 6, 8 and housing 18, 20 will be made of a heat resistant non-conducting plastic material such as a phenolic molding. A thumb button 30 is conveniently operated by the welder to control amperage of the welding current during operation. This can be done conveniently on line and enables virtually instant current changes to be made at any time during the formation of a weld.

One problem with fingertip control welding torches in the past has been that of accidentally turning on the torch by unintentionally moving the control button from the off position. Various means including friction devices or springs, such as is shown in the aforementioned U.S. Pat. No. 4,051,344, have been employed to bias the button into the off position. Not withstanding these constructions, there has been no positive way to retain the button and it is readily moved into a position where current is supplied to the torch. This problem of accidental movement of the control button is especially addressed in the present invention as will now be described. Thumb button 30 is pivotally mounted by pin 32 to a control arm 34. This control arm actuates both a linear potentiometer 48 and a miniature switch 54.

Control arm 34 extends through a slot 36 in cover 20. The thumb button 30 has a cavity 38 in its forward portion. This cavity has a shoulder 39 which forms one portion of a latch mechanism. The other portion of the latch is formed by an upstanding retainer lug 40 secured to cover 20. This lug should be considered as being integral with the body of the torch. Lug 40 has a tapered leading end 42, formed at an acute angle with the axis of the body, which forms a ramp so that the forward end of thumb button 30 may easily ride up and over the lug without any effort on the part of the welder. A ball and spring loading mechanism 44, 46 biases the forward end of the thumb button in a downward position so that it would normally engage and latch onto lug 40 when in its extreme forward position. As can be seen by reference to FIG. 3, the thumb button can be moved rearward into operating position simply by pressing downward on the end closest to the welder to compress spring 46 and lift latching shoulder 39 off of lug 40.

Linear potentiometer 48 has a conventional resistance strip 50 which is contacted by an armature 52 to control the resistance in the circuit. Control arm 34 has a forward portion 35 which engages the switch control plunger 56 of a miniature switch 54. As shown in FIG. 3, switch 54 is held in the off position by the pressure of control arm extension 35 on plunger 56.

As is seen in FIG. 4, linear potentiometer 48 is in a low voltage low current circuit tied to control circuitry 60 which regulates the current output of main power source 62. In similar fashion, the on/off switch 54 is in a low voltage circuit which controls a primary or main contactor 64 on power source 62.

It will be evident to those skilled in the art that many changes could be made in the mechanism described without departing from the spirit of the present invention. For example, switch 54 could be mounted at the other end of housing 20 so that it is turned off when the thumb button is at the opposite extreme of its travel from that shown in the drawings. With the full understanding that such changes in construction and operation can be made, the invention should be considered limited only as it is defined in the following claims.

I claim:

1. A tungsten inert gas electric welding torch which comprises;
   an axially elongated body sized to be held in a users hand;
   a head portion attached to the body, the head portion containing a welding electrode and means to shield the electrode and a weld area with an inert gas;
   a linear potentiometer contained within the body, the potentiometer serving to control welding current;
   an on-off switch also contained within the body;
   an upstanding linearly moveable control arm operatively associated with the potentiometer and switch;
   a thumb button located adjacent the body and pivotally attached to the control arm, the thumb button serving to move the control arm so as to operate the switch and linear potentiometer and give a welder on-line control of welding current by linear movement of the thumb button, the switch being located so as to be actuated into the off position by the control arm at one travel extreme of the thumb button,
   an upstanding lug means associated with the torch body; and
   a latch means associated with the thumb button and positioned to engage the lug means at said one extreme position of thumb button travel so as to retain the button against accidental movement and maintain the switch in the off position until the button is rocked on its pivotal mounting to raise and disengage the latch means from the upstanding lug means and enable operation of the welding torch.

2. The electric welding torch of claim 1 in which the latch means comprises a cavity formed within the thumb button, the cavity having a shoulder portion to engage the upstanding lug means.

3. The electric welding torch of claim 1 in which the lug means has a leading edge formed at an acute angle with the body so as to form a ramp and enable the thumb button to readily slide over the lug means and actuate the switch into the off position without the latch means being consciously raised by the welder.

4. The electric welding torch of claim 2 in which the lug means has a leading edge formed at an acute angle with the body so as to form a ramp and enable the thumb button to readily slide over the lug means and actuate the switch into the off position without the latch means being consciously raised by the welder.

* * * * *